(12) United States Patent
Gehrmann et al.

(10) Patent No.: US 9,141,776 B2
(45) Date of Patent: Sep. 22, 2015

(54) METHOD AND APPARATUS FOR SECURE HARDWARE ANALYSIS

(75) Inventors: Christian Gehrmann, Lund (SE); Kent Damberg, Växjö (SE); Bernard Smeets, Dalby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 2213 days.

(21) Appl. No.: 12/112,360

(22) Filed: Apr. 30, 2008

(65) Prior Publication Data

US 2009/0276844 A1 Nov. 5, 2009

(51) Int. Cl.
G06F 21/31 (2013.01)
G06F 21/44 (2013.01)
G06F 21/74 (2013.01)

(52) U.S. Cl.
CPC .............. *G06F 21/31* (2013.01); *G06F 21/445* (2013.01); *G06F 21/74* (2013.01); *G06F 2221/2103* (2013.01); *G06F 2221/2129* (2013.01)

(58) Field of Classification Search
CPC ....... G06F 21/31; G06F 21/74; G06F 21/445; G06F 2221/2129; G06F 2221/2103
USPC .......................................................... 726/16
See application file for complete search history.

(56) References Cited

U.S. PATENT DOCUMENTS

| 6,026,293 | A | 2/2000 | Osborn | |
|---|---|---|---|---|
| 6,622,184 | B1 * | 9/2003 | Tabe et al. | 710/36 |
| 6,754,830 | B1 * | 6/2004 | Laiho et al. | 726/21 |
| 7,080,258 | B2 | 7/2006 | Kawasaki et al. | |
| 7,281,138 | B1 | 10/2007 | Di Benedetto | |
| 7,373,503 | B2 * | 5/2008 | Nakano et al. | 713/158 |
| 7,600,166 | B1 * | 10/2009 | Dunn et al. | 714/726 |
| 2003/0014643 | A1 | 1/2003 | Asami et al. | |
| 2003/0051192 | A1 * | 3/2003 | Pillay et al. | 714/39 |
| 2003/0093702 | A1 * | 5/2003 | Luo et al. | 713/320 |
| 2003/0140245 | A1 * | 7/2003 | Dahan et al. | 713/200 |
| 2003/0206627 | A1 | 11/2003 | Penugonda et al. | |
| 2004/0034823 | A1 * | 2/2004 | Watkins et al. | 714/724 |

(Continued)

FOREIGN PATENT DOCUMENTS

| CA | 2536610 | 8/2005 |
|---|---|---|
| EP | 1217850 A1 | 6/2002 |

(Continued)

OTHER PUBLICATIONS

Giordano, Phil, "Lockbox Secure Technology on Blackfin Processors," Analog Devices, 45 pages; http://www.analog.com/processors/pdf/bold/Lockbox_Secure_Technology_slides.pdf Aug. 2, 2007.

(Continued)

*Primary Examiner* — Kenneth Chang
(74) *Attorney, Agent, or Firm* — Coats and Bennett, PLLC (57) ABSTRACT

A Hardware Analysis Module ("HAM") embedded in an integrated circuit (IC) implements a dedicated hardware-controlled access control procedure. The secure hardware analysis features are unlocked by a key unit subject to successful completion of an access control procedure. The access control procedure prevents unlocking of the secure hardware analysis features by an unauthorized or compromised key unit by including an embedded control command in an authentication challenge sent by the HAM to the key unit during the access control procedure.

16 Claims, 5 Drawing Sheets

(56) References Cited

U.S. PATENT DOCUMENTS

| | | | |
|---|---|---|---|
| 2004/0128523 A1* | 7/2004 | Fujioka | 713/189 |
| 2004/0163013 A1 | 8/2004 | Watt et al. | |
| 2004/0177269 A1 | 9/2004 | Belnet et al. | |
| 2004/0210797 A1 | 10/2004 | Kimelman et al. | |
| 2004/0222305 A1* | 11/2004 | Leaming | 235/492 |
| 2005/0193220 A1 | 9/2005 | Little et al. | |
| 2005/0246523 A1 | 11/2005 | Mauro, II et al. | |
| 2005/0268092 A1 | 12/2005 | Shankar et al. | |
| 2005/0289355 A1* | 12/2005 | Kitariev et al. | 713/182 |
| 2006/0129848 A1 | 6/2006 | Paksoy et al. | |
| 2006/0200682 A1* | 9/2006 | Hars et al. | 713/193 |
| 2006/0242465 A1 | 10/2006 | Cruzado et al. | |
| 2006/0248393 A1 | 11/2006 | Hatakeyama | |
| 2006/0282734 A1 | 12/2006 | Milne et al. | |
| 2007/0011023 A1 | 1/2007 | Silverbrook | |
| 2007/0118880 A1 | 5/2007 | Mauro, II | |
| 2007/0220337 A1 | 9/2007 | Itoh et al. | |
| 2007/0234068 A1 | 10/2007 | Silverbrook et al. | |
| 2007/0234420 A1 | 10/2007 | Novotney et al. | |
| 2007/0271461 A1 | 11/2007 | Hardy et al. | |
| 2008/0148343 A1* | 6/2008 | Taniguchi | 726/1 |
| 2008/0282087 A1* | 11/2008 | Stollon et al. | 713/171 |

FOREIGN PATENT DOCUMENTS

| | | |
|---|---|---|
| WO | 2007/023457 A2 | 3/2007 |
| WO | 2007062020 | 5/2007 |

OTHER PUBLICATIONS

Giordano, Phil, "Lockbox Secure Technology on Blackfin Processors, Blackfin Online Learning & Development," 2007 Analog Devices, Inc., 19 pages; http://www.analog.com/processors/pdf/bold/lockbox_secure_technology_transcript.pdf.

Akselrod, Dimitry; Ashkenazi, Asaf; and Amon, Yossi, "Platform Independent Debug Port Controller Architecture with Security Protection for Multi-Processor System-on-Chip ICs," Design, Automation and Test in Europe, 2006. Date '06. Proceedings, Mar. 6-10, 2006, vol. 2, 6 pages.

Suh, Gookwon Edward, "AEGIS: A Single-Chip Secure Processor," submitted to Department of Electrical Engineering and Computer Science at Massachusetts Institute of Technology, Sep. 2005, 240 pages.

Trimberger, Steve, "Trusted Design in FPGAs," http://videos.dac.com/44th/slides/1_2.ppt#303,2,Trusted Design in FPGAs, 26 pages. Mar. 30, 2007.

Gagnon, Michael N.; Taylor, Stephen; and Ghose, Anup K., "Software Protection through Anti-Debugging," IEEE Computer Society, IEEE Security & Privacy, 2007, pp. 82-84; http://ieeexplore.ieee.org/ie15/8013/4218538/04218560.pdf.

Discretix embedding security solutions, 2 pages; http://www.discretix.com/CryptoCell/. Date 2007.

Menezes, A.J.; van Oorschot, Paul; and Vanstone, Scott, "Handbook of applied cryptography," Library of Congress Cataloging-in-Publication Data, CRC Press, Inc., 1997, 4 pages.

* cited by examiner

METHOD AND APPARATUS FOR SECURE HARDWARE ANALYSIS

FIELD OF THE INVENTION

The present invention relates generally to secure hardware analysis and, more particularly, to a method and apparatus to control access to secure hardware analysis features in production devices.

BACKGROUND

Mobile communication devices, such as cellular telephones, typically contain highly sensitive data that is used to authenticate mobile devices and mobile subscribers when the mobile device accesses a communication network. Such information is typically stored in a secure hardware or secure memory. In order to perform testing of integrated circuits in a mobile telephone, it may be necessary to disable security functions in the integrated circuit in order to perform a complete analysis of the integrated circuit with dedicated test software. For example, the test software may need to access production test features in the integrated circuit, which are typically disabled before the device is sold. Examples of secure hardware analysis features include central processing unit (CPU) debug and trace, internal memory read/write, internal scan, and external boot features. Access to secure hardware analysis features represents a major security risk. Therefore, access to such secure hardware analysis features should be granted only after authentication of the user.

Several different authentication mechanisms for mobile terminal platforms have been introduced or suggested. For example, advanced RISC machines (ARM) provide secure debugging access based on public key authentication procedures. The ARM authentication procedure, however, provides only limited access to secure hardware analysis features. Therefore, there is a need for new security measures to protect secure hardware analysis features in production devices that allows the secure hardware analysis features to be re-enabled for hardware testing.

SUMMARY

The present invention provides a method and apparatus to protect secure hardware analysis features for an integrated circuit (IC) from unauthorized access. According to the present invention, secure hardware analysis features disabled in production devices may be "unlocked" for testing of an integrated circuit by authorized users. Contemplated hardware analysis features subject to secure unlocking include CPU debug and trace, internal memory read/write, external boot, and internal "scan" functions.

In one exemplary embodiment, a Hardware Analysis Module ("HAM") embedded in the IC device implements a dedicated hardware-controlled access control procedure. The secure hardware analysis features for an IC are unlocked by a key unit subject to successful completion of an access control procedure. When the key unit initiates the access control procedure, the HAM generates an authentication challenge including an embedded command that when set to a predetermined value renders the key unit inoperable to unlock the secure hardware analysis features. The HAM sends the authentication message to the key unit, receives a challenge response from the key unit responsive to the first authentication message, and authenticates the key unit based on the challenge response. The HAM may receive a key unit identifier from the key unit during the access control procedure. If the HAM determines that the key unit has been compromised, the embedded command is set to prevent unlocking of the secure hardware analysis features.

In one exemplary embodiment, a key unit holds a private key that is required for unlocking the secure hardware analysis features of the IC. The HAM holds a public key corresponding to the private key held in the dedicated key unit for the IC device in which the HAM is embedded. The HAM "unlocks" the secure hardware analysis features only after conducting a successful authentication procedure with the dedicated key unit. That procedure relies on the public/private keys and on additional security parameters accessible to the HAM, and which may be held in a protected fusable memory of the IC.

The functions of the dedicated key unit may be implemented via "smart cards" or other devices or modules offering similar electronic and physical security. The key unit may, in some embodiments, couple to a network server and communicate with the HAM over a communication network. The IC device may include physical security features that may be permanently set to disable unlocking. This aspect may be useful where key security is compromised. For example, the IC device may include fusable memory or other One-Time-Programmable (OTP) element that determines whether the HAM will allow device unlocking.

Further refinements of the invention include embodiments where the dedicated key unit may be locked or otherwise disabled from further use, such as where key security has been compromised. Further, the authentication procedures may differentiate between customer access (e.g., access by a network service provider or device vendor) versus access by the device/IC manufacturer (e.g., access by Ericsson Mobile Platforms).

Some embodiments of the invention may impose limits on key use. For example, key use may require a temporary authorization code limited to a defined number of unlocks. A new code would be required to use the key beyond that limited number of unlocks.

DETAILED DESCRIPTION

Figure 1:
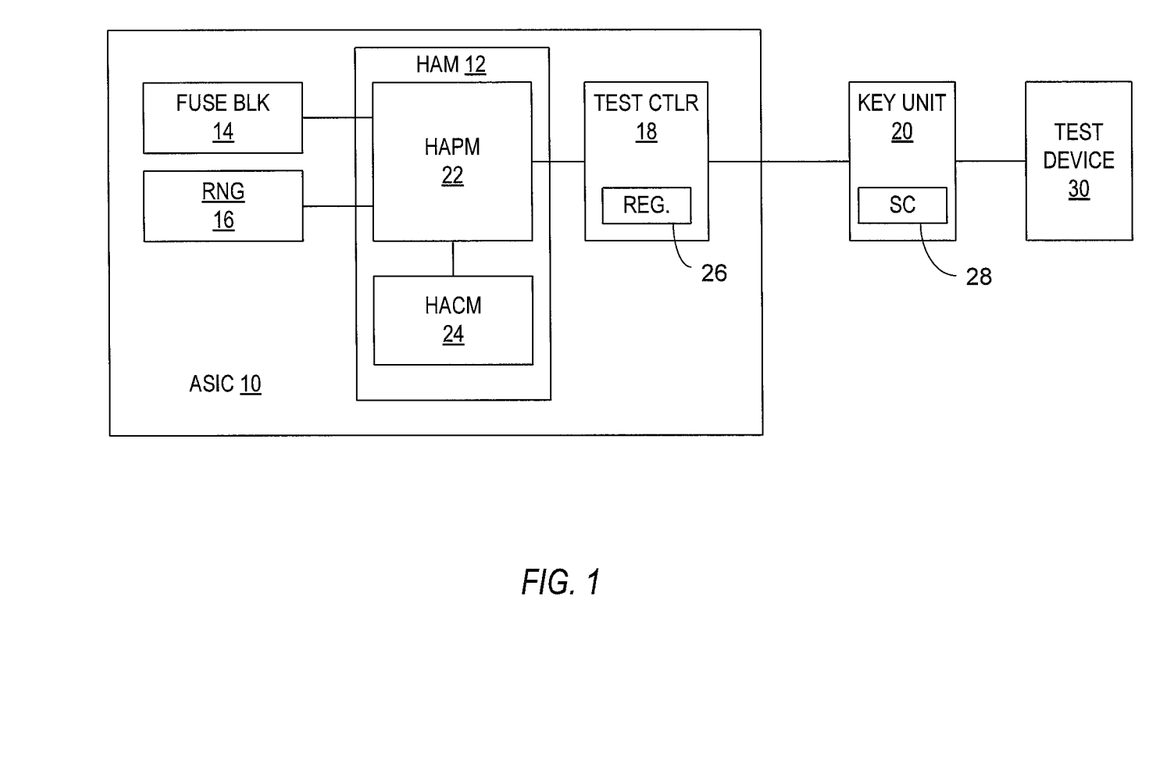
FIG. 1 illustrates an integrated circuit with a Hardware Analysis Module (HAM) to provide secure access to hardware analysis features of the IC, and a key unit for unlocking the secure hardware analysis features.

Referring now to the drawings, FIG. 1 shows an exemplary integrated circuit (IC) 10 with a hardware analysis module (HAM) 12 to restrict access to secure hardware analysis features, along with a key unit 20 to "unlock" the secure hardware analysis features of the IC 10 to provide access for a test device 30. HAM 12 interfaces with three other hardware modules of the IC 10: a fuse block 14, a random number generator 16, and a test controller 18. The fuse block 14 stores security parameters for HAM 12. The security parameters may include, for example, an access control indicator and a customer identifier CID. The access control indicator is used to determine whether access to secure hardware analysis features is ever allowed. The customer identifier is used to differentiate between different manufacturers in the access control procedure. In some embodiments, the fuse block 14 may also store revocation bits used to revoke encryption keys used in the authentication procedure. Random number generator 16 generates random numbers used to perform various cryptographic algorithms as hereinafter described. The test controller 18 comprises a hardware controller to enable secure communication between the HAM 12 and key unit 20. The test controller 18 includes a dedicated register 26 for communication between the HAM 12 and key unit 20, as will be hereinafter described. Briefly, HAM 12 and key unit 20 communicate by writing data to and reading data from the dedicated register 26 in the test controller 18.

The HAM 12 comprises two modules: the hardware analysis protocol module (HAPM) 22 and the hardware analysis core module (HACM) 24. The HAPM 22 interfaces with the fuse block 14, random number generator 16, and test controller 18. The HAPM 22 implements the access control protocol with the key module 20. Communications with the key module 20 are made via the test controller 18. More particularly, communication between the HAPM 22 and key unit 20 is carried out by reading data into and out of a dedicated register 26 in the test controller 18. The HACM 24 handles computationally complex cryptographic tasks for the HAPM 22. The HAPM 22 includes a fuse interface FUSE_IF to read security settings stored in the fuse block 14, a random number generator interface RNG_IF to retrieve random numbers from the random number generator 16, a main HAM interface HAM_IF to communicate with the test controller 18, and a core module interface HACM_IF to communicate with the HACM 24.

The key unit functions of the dedicated key unit 20 may be implemented via tamper-proof smart cards 28 having secure processing and memory resources, or other devices or modules offering similar electronic and physical security. The key unit 20 may, in some embodiments, couple to a network server and communicate with the HAM 12 over a communication network.

At power-up, the secure hardware analysis features of the IC 10 are protected from hacking by disabling all security features until after the IC 10 reaches a stable state. For example, the security features may be disabled for a predetermined period of time, e.g., 300 microseconds, which should provide enough time for the IC 10 to reach a stable state. After the predetermined time period has expired, the secure hardware analysis features may be unlocked for testing through a hardware controlled access control procedure.

Figure 2:
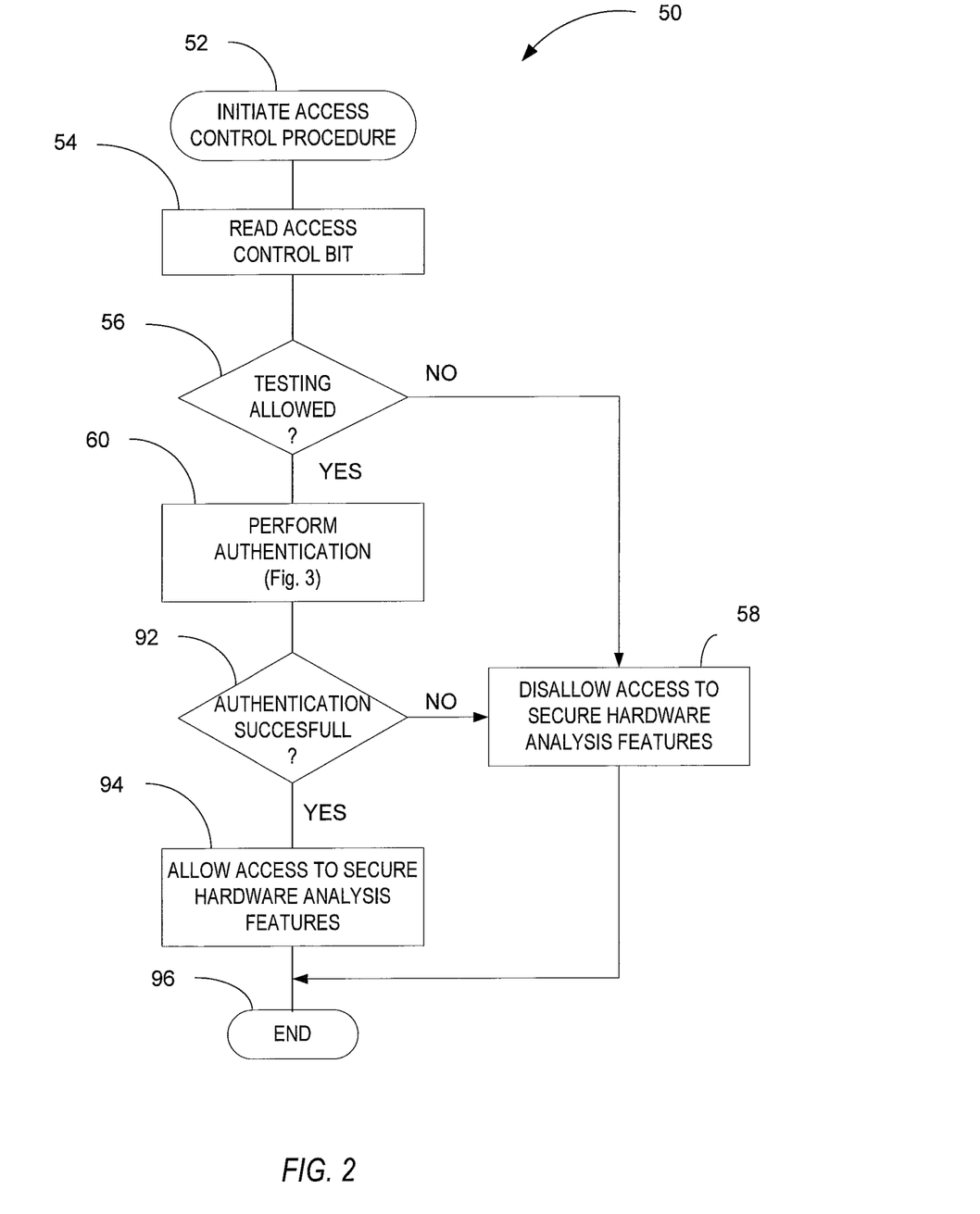
FIG. 2 illustrates an exemplary access control method implemented by the HAM for providing access to secure hardware analysis features in an integrate circuit.
Figure 3:
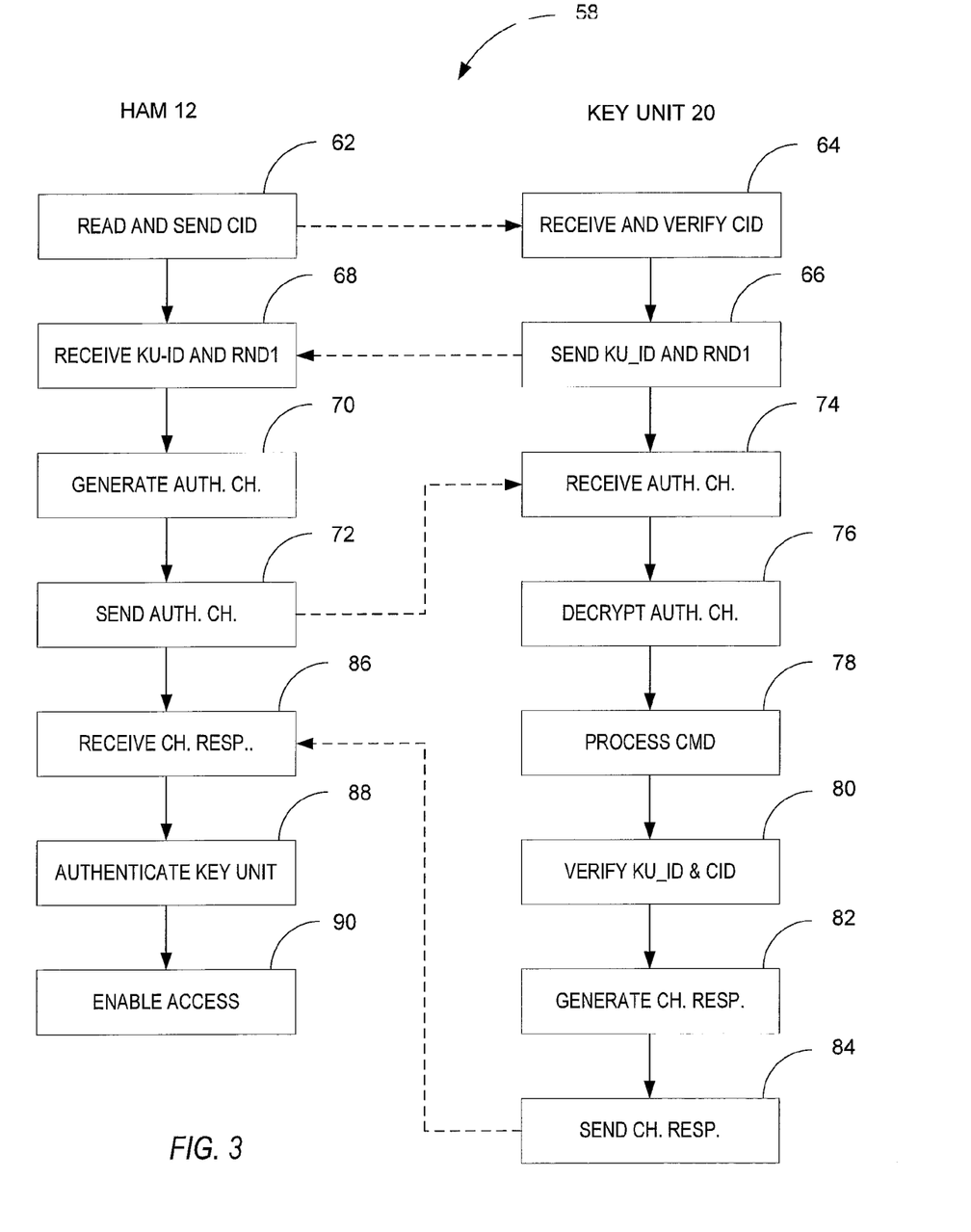
FIG. 3 illustrates an exemplary method implemented by a key unit for securely accessing secure hardware analysis features in an integrated circuit.

FIG. 2 illustrates one exemplary access control procedure 50. The access control procedure 50 begins with the HAM 12 in a safe mode. In the safe mode, the secure hardware analysis features of the IC 10 are locked or disabled. The key unit 20 connects to a test access port (TAP) of the IC 10 to initiate the access control procedure (block 52). In one exemplary embodiment, the key unit 20 sets a HAM indication bit in the dedicated register 26 in the test controller 18 to a predetermined value to initiate the access control procedure. The test controller 18 sends a reset signal to the HAM 12, which reads the HAM indication bit from the register 26. Upon receipt of the reset signal, the HAM 12 reads an access control bit from the fuse block 14 (block 54) and determines whether access to the secure hardware analysis features is allowed (block 56). For example, if the access control bit is set to a first value (e.g., a value of "0"), then access to the secure hardware features will not be allowed (block 58). If the access control bit is set to a second value (e.g., a value of "1"), access may be allowed upon proper authentication. If access to secure hardware features is allowed, the HAM 12 and key unit 20 perform an authentication procedure (block 60). The authentication procedure is shown in FIG. 3 and described more fully below. Upon successful completion of the authentication procedure (block 92), HAM 12 will enable access to secure hardware analysis features in the IC 10 (block 94) and the procedure ends (block 96). In one embodiment, the HAM 12 outputs a security bit to the test controller 18. When the security bit is set, the key unit 20 will switch to a transparent mode to allow emulators, production testers, and other test devices 30 to communicate with the test controller 18. At the end of testing, the IC 10 is returned to safe mode by cycling the power to the IC 10.

Referring now to FIG. 3, an exemplary authentication procedure 60 (FIG. 2, box 60) performed by the HAM 12 and key unit 20 is shown. The left side of FIG. 3 illustrates the actions taken by the HAM 12, while the right side of FIG. 3 illustrates corresponding actions taken by the key unit 20. At the start of the authentication procedure, the HAM 12 reads a customer identifier CID from fuse block 14 and sends the customer identifier CID to the key unit 20 (block 62). The customer identifier CID could be read at the same time the access control bit is read and sent only if the access control bit is set to enable secure access to the secure hardware analysis features. The key unit 20 receives and verifies the customer identifier CID (block 64). If the customer identifier CID is verified, the key unit 20 sends a key unit identifier KU_ID and a first random number RND1 to the HAM 12 (block 66). The HAM 12 receives the key unit identifier KU_ID and the first random number RND1 (block 68), generates an authentication challenge C (block 70), and sends the authentication challenge to the key unit 20 (block 72). The authentication challenge C includes an authentication sequence SEQ generated using the first random number RND1, the key unit identifier KU_ID received from the key unit 20, a customer identifier (CID), and a command value CMD. The authentication challenge C may be written as:

$$C = E(REQ) = E(SEQ \| KU\_ID \| CID \| CMD), \quad \text{Eq. (1)}$$

where the symbol $\|$ represents concatenation and where E denotes the encryption of REQ using the chosen public key. In one exemplary embodiment, the HAPM 22 first reads a HAM_FUSE_KEY through the FUSE_IF interface and computes a secret S using the HAM_FUSE_KEY and second random number RND2 according to:

$$S = HAM\_FUSE\_KEY \oplus RND2, \quad \text{Eq. (2)}$$

where the symbol $\oplus$ represents the exclusive OR operation. The purpose of the HAM_FUSE_KEY is to compensate for imperfections of the random generator connected to the HAM to create/insert device specific randomness. Thus, the secret S will not be the same for different devices. The HAPM 22 then stores this secret S in memory for future use. The authentication sequence SEQ is then computed using the secret S and first random value RND1 according to:

$$SEQ = RND1 \oplus (S \| S \| S \| S). \quad \text{Eq. (3)}$$

Preferably, the authentication challenge C is encrypted with a public key associated with the key unit 20. The authentication challenge C may comprise a multi-part message or single part message. The key unit 20 receives the authentication challenge C from the HAM 12 (block 74) and decrypts the authentication challenge C (block 76). As noted earlier, the authentication challenge C includes an embedded command CMD. Encryption assures that the value of CMD cannot be recovered by anybody else than an entity that has possession of the secret key corresponding to the public key that was used for encrypting REQ. The command CMD is processed by the key unit 20 (block 78). The command CMD may be used to render the key unit 20 inoperable to unlock the secure hardware analysis features of the IC 10. If the key unit 20 has been compromised, the HAM 12 may set the command CMD to a predetermined value that causes the key unit 20 to abort the authentication procedure. In some embodiments, the command CMD may cause the key unit 20 to disable itself, thereby rendering it unusable.

After the command CMD is processed, the key unit 20 verifies the key unit identifier KU_ID and customer identifier CID returned by the HAM 12 (block 80). The key unit 20 is preferably configured to abort the authentication procedure if the correct value for the key unit identifier KU_ID and customer identifier CID is not returned by the HAM 12. Assuming that the key unit identifier KU_ID and CID are correct, and that the command CMD does not end the authentication procedure, the key unit 20 generates a challenge response (block 82) and sends the challenge response to the HAM 12 (block 84). More particularly, the key unit 20 calculates the secret value S' based on the information received from the HAM 12 and includes the secret value S' in the challenge response. More particularly, after SEQ is decrypted, the key unit 20 can compute S' from SEQ based on its knowledge of RND1. The HAM 12 receives the challenge response (block 86) from the key unit 20 and authenticates the key unit 20 by comparing the secret value S' returned by the key unit to the secret value S stored in memory (block 88). If the values match, then the key unit 20 is deeded to be authorized. As previously noted, if the key unit 20 is authenticated, the security bit is set to allow access to the secure hardware analysis features of the IC 10 (block 90).

Figure 4A:
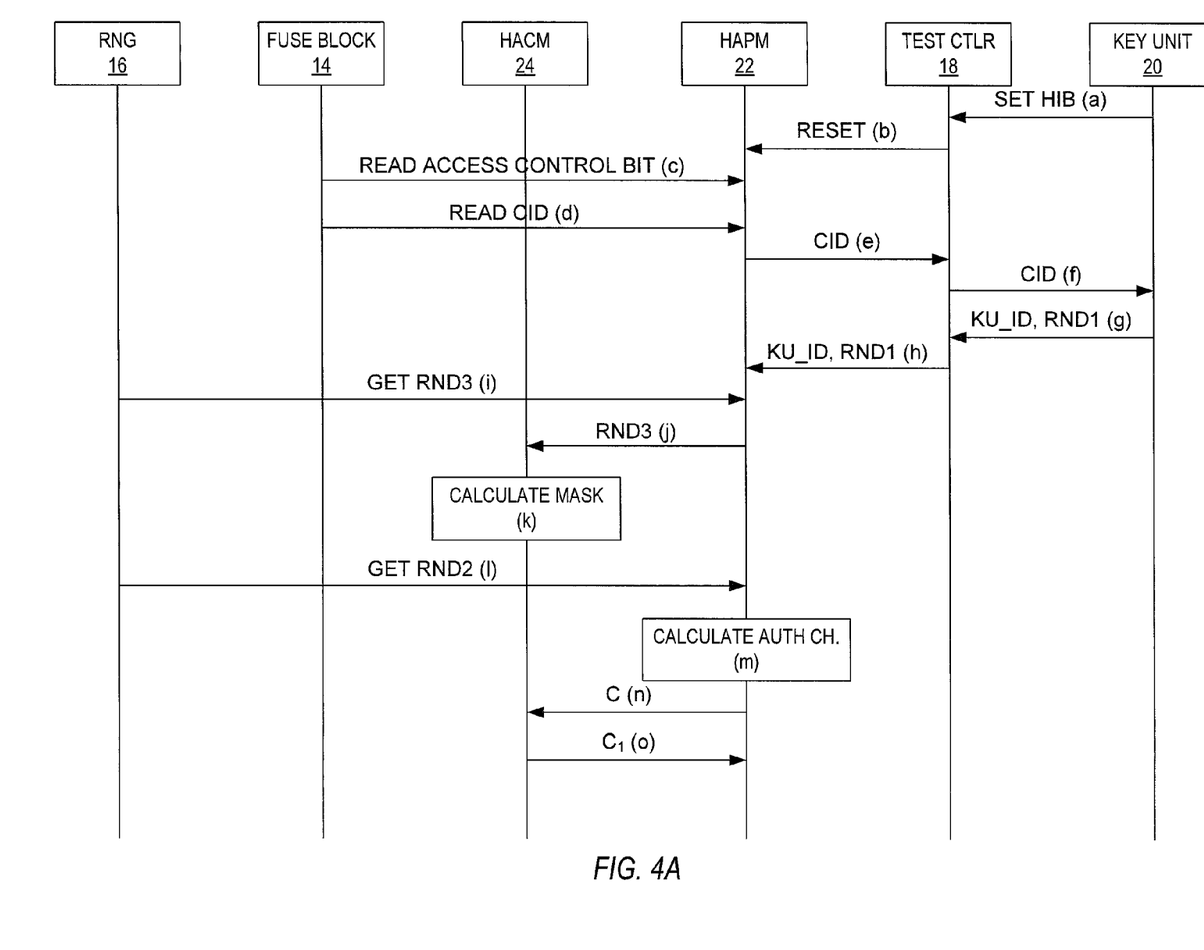
FIGS. 4A and 4B show a detailed call flow diagram representing interaction between the HAM and key unit according to one exemplary embodiment.
Figure 4B:
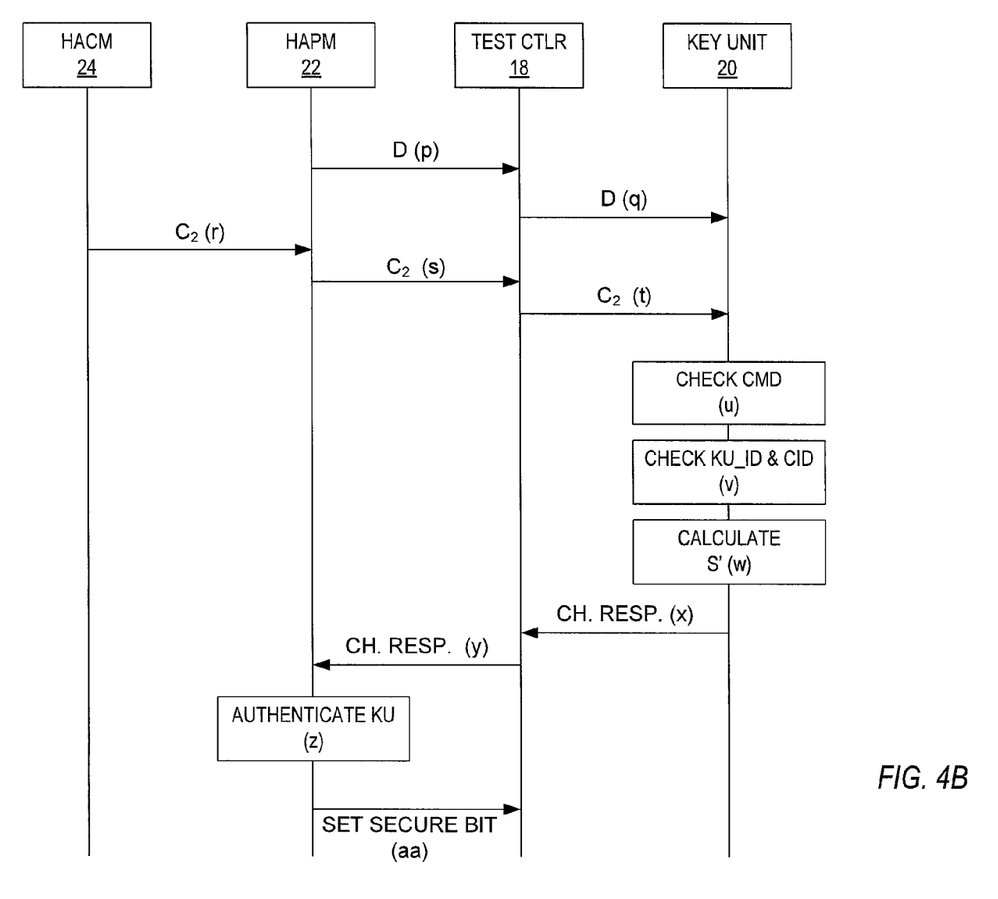

FIGS. 4A and 4B illustrate a detailed example providing further details of an exemplary access control procedure for accessing secure hardware analysis features in an exemplary IC 10. The procedure shown in FIGS. 4A and 4B is just one exemplary procedure that could be used. Those skilled in the art will appreciate that numerous variations of this procedure are possible.

To begin the access control procedure, the key unit 20 sets a HAM indication bit in the register 26 of the test controller 18 (step a) and the test controller 18 sends a reset command to the HAPM 22 (step b). The HAPM 22 reads the access control bit from the fuse block 14 (step c). As previously noted, the access control bit may be set to a predetermined value to disable access to the secure hardware analysis features. If access is allowed, the HAPM 22 reads a customer identifier CID from the fuse block 14 (step d) and writes the CID to the test controller register 26 in the test controller 18 (step e). The test controller indicates "ready" to the key unit 20. The key unit 20 reads the customer identifier CID from the test controller register 26 and verifies that the customer identifier CID is correct (step f). If the CID is not correct, the key unit 20 may write an error message back to the test controller register 26 and abort the authentication procedure.

If the customer identifier CID is correct, the key unit 20 writes a key unit identifier KU_ID and a first random number RND1 to the test controller register 26 (step g). The test controller 18 indicates "ready" to the HAPM 22. The HAPM 22 reads the key unit identifier KU_ID and first random number RND1 from the test controller register 26 (step h), gets a third random number RND3 from the random number generator 16 (step i), and passes the third random number RND3 to the HACM 24 through the HACM interface HAM_IF (step j). The HACM 24 uses the third random number RND3 to calculate an El Gamal masking value, which forms the first part of an encryption message (step k).

The HAPM 22 gets the second random number RND2 from the random number generator 16 (step l) and uses the second random number RND2 to calculate an authentication challenge (step m). In one exemplary embodiment, the HAPM 22 uses the first random number RND1 received from the key unit 20 to calculate a HAM_FUSE_KEY. The second random number RND2 and the HAM_FUSE_KEY are then used to calculate a secret S as shown in Eq. 2. The secret S is stored in memory in the HAPM 22.

The HAPM 22 calculates an authentication challenge C (Eq. 3 and Eq. 1) and sends the authentication challenge C to the HACM 24 (step n). As noted above, the authentication challenge C includes four parts. The first part is an authentication sequence SEQ computed based on the first random number RND1 and the secret S (Eq. 3). The second part comprises the key unit identifier KU_ID. The third part comprises the customer ID (CID), and the fourth part comprises a command CMD. The command CMD is used to potentially lock down or disable unauthorized key units 20 or key units 20 that may have been compromised.

The HACM 24 uses a public key associated with the key unit 20 to encrypt the authentication challenge C and returns the authentication challenge C to the HAPM 22 in two parts denoted herein as $C_1$ and $C_2$. When the HAPM 22 receives the first part $C_1$ of the encrypted authentication challenge from the HACM 24 (step o), it forms a message D by concatenating three revocation bits REVOC retrieved from the fuse block 14 with the first part of the encrypted authentication challenge $C_1$ and sends the message D to the test controller 18 (step p). The revocation bits are used to inform the key unit 20 if any of the public keys have been revoked. The test controller 18 indicates "ready" to the key unit 20 and the key unit 20 reads the message D from the test controller register 26 (step q). When the second part $C_2$ of the encrypted authentication challenge is ready, the HACM 24 indicates "ready" to the HAPM 22. The HAPM 22 gets the second part of the encrypted authentication challenge $C_2$ from the HACM 24 (step r) and writes the second part of the encrypted authentication challenge $C_2$ to the test controller register 26 (step s). The test controller 18 indicates "ready" to the key unit 20 and the key unit 20 reads the second part of the encrypted authentication challenge $C_2$ from the register 26 (step t).

As noted previously, the authentication challenge C includes a command CMD. After decrypting the authentication challenge C using its private key, the key unit 20 checks the command CMD (step u). If the command CMD is equal to a predetermined value, the key unit 20 aborts the authentication procedure and writes an error message to the test controller register 26. Thus, the command CMD provides a mechanism to prevent a compromised key unit 20 from unlocking secure hardware analysis features in the IC 10. If a key unit 20 is suspected of being compromised, the HAM 12 may include an embedded command in the authentication challenge to prevent the key unit 20 from successfully completing the authentication procedure. Thus, the key unit 20 is rendered inoperable to unlock the secure hardware analysis features of the IC 10. Those skilled in the art will appreciate that the command could cause the key unit 20 to permanently disable itself to render it unusable in the future.

If the authentication procedure continues, the key unit 20 checks the key unit identifier KU_ID and the customer identifier CID returned by the HAM 12 (step v). If the key unit identifier KU_ID is not correct, or if the CID returned is different from the CID returned in step e, the authentication procedure is aborted. If these values are correct, the key unit 20 calculates a secret S' from the first part of the authentication challenge (step w) and writes an challenge response including the secret S' to the test controller register 26 (step x). The test controller 18 indicates "ready" to the HAPM 22. The HAPM 22 reads the challenge response returned by the key unit 20 from the test controller register 26 (step y) and compares the secret S' received from the key unit 20 to the secret S stored in memory to authenticate the key unit 20 (step z). If the key unit is successfully authenticated, the HAPM 22 sets the security bit in the test controller 18 (step aa) to unlock the secure hardware analysis features.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An access control method of controlling access to secure hardware analysis features in an integrated circuit, said method comprising:
   generating an authentication challenge including an embedded command that when set to a predetermined value renders a key unit inoperable to unlock the secure hardware analysis features;
   sending the authentication challenge to the key unit;
   receiving a challenge response from the key unit responsive to the authentication challenge; and
   authenticating the key unit based on the challenge response.

2. The method of claim 1 further comprising:
   receiving a key unit identifier from said key unit;
   determining whether the key unit is a compromised key unit based on the key unit identifier; and
   if the key unit is a compromised key unit, setting the embedded command in the authentication challenge to said predetermined value to render the key unit inoperable to unlock the hardware analysis features.

3. The method of claim 1 further comprising;
   checking an access indicator stored in a secure memory; and
   disallowing access to said secure hardware analysis features if said access indicator is set to a predetermined value.

4. The method of claim 1 further comprising storing a customer identifier associated with one or more customers in a secure memory device, sending said customer identifier to said key unit, receiving an error message from the key unit if the customer identifier is invalid for the key unit, and disallowing access to said secure hardware features responsive to said error message.

5. The method of claim 1 further comprising encrypting said authentication challenge with a public encryption key corresponding to a private key associated with the key unit before sending said authentication challenge to said key unit.

6. The method of claim 5 further comprising storing a revocation code in a secure memory, reading said revocation code from said secure memory, and revoking said public encryption key if said revocation code has a predetermined value.

7. A device for controlling access to secure hardware analysis features in an integrated circuit, said device comprising a secure memory for storing security parameters and a hardware analysis module with access to said secure memory to control access to said secure hardware analysis features, said hardware analysis module configured to:
   generate an authentication challenge including an embedded command that when set to a predetermined value renders a key unit inoperable to unlock the secure hardware analysis features;
   send the authentication challenge to the key unit;
   receive a challenge response from the key unit responsive to the authentication challenge; and
   authenticate the key unit based on the challenge response.

8. The device of claim 7 wherein the hardware analysis module is further configured to receive a key unit identifier from the key unit, to determine whether the key unit is a compromised key unit based on the key unit identifier; and to set the embedded command in the authentication challenge to said predetermined value to render the key unit inoperable to unlock the hardware analysis features if the key unit is a compromised key unit.

9. The device of claim 7 wherein the hardware analysis module is further configured to check an access indicator stored in said secure memory, and disallow access to said secure hardware analysis features if said access indicator is set to a predetermined value.

10. The device of claim 7 wherein said secure memory is configured to store a customer identifier associated with one or more customers, and wherein said hardware analysis module is further configured to send said customer identifier to said key unit, receive an error message from the key unit if the customer identifier is invalid for the key unit, and disallow access to said secure hardware features responsive to said error message.

11. The device of claim 7 wherein the hardware analysis module is further configured to encrypt said authentication challenge with an encryption key before sending said authentication challenge to said key unit.

12. The device of claim 11 wherein the secure memory is configured to store a revocation code and wherein the hardware analysis module is further configured to read said revocation code from said secure memory, and revoke said encryption key if said revocation code has a predetermined value.

13. A method of access control implemented by a key unit used to unlock secure hardware analysis features in an integrated circuit, said method comprising:
   receiving an authentication challenge from an access control device, said authentication challenge including an embedded command, wherein the authentication challenge includes an embedded command that when set to a predetermined value renders the key unit inoperable to unlock the secure hardware analysis features;
   processing the embedded command received as part of the authentication challenge; and
   selectively continuing an access control procedure based on the embedded command.

14. The method of claim 13 further comprising receiving a customer identifier from said access control device, and selectively aborting said access control procedure based on said customer identifier.

15. A key unit for unlocking secure hardware analysis features in an integrated circuit, said key unit including a hardware processor configured to:
   receive an authentication challenge from an access control device, said authentication challenge including an embedded command, wherein the embedded command, when set to a predetermined value, renders the key unit inoperable to unlock the secure hardware analysis features;
   process the embedded command received as part of the authentication challenge; and selectively continue an access control procedure based on the embedded command.

16. The key unit of claim 15 wherein the processor is further configured to receive a customer identifier from said access control device, and selectively abort said access control procedure based on said customer identifier.

* * * * *